United States Patent [19]
Waschk et al.

[11] 4,202,618
[45] May 13, 1980

[54] ELECTROSTATIC COPYING MACHINE HAVING FLASH-DISCHARGE-LAMP FIXING UNIT

[75] Inventors: Fritz Waschk, Unterhaching; Heinz Webersik, Munich; Rudolf Schinagl, Unterhaching, all of Fed. Rep. of Germany

[73] Assignee: AGFA-Gevaert, A.G., Leverkusen, Fed. Rep. of Germany

[21] Appl. No.: 866,658

[22] Filed: Dec. 30, 1977

[30] Foreign Application Priority Data

Nov. 11, 1977 [DE] Fed. Rep. of Germany ....... 2750485

[51] Int. Cl.[2] ...................... G03G 15/00; G03B 27/52

[52] U.S. Cl. ................................ 355/3 FU; 219/216; 355/30

[58] Field of Search .................. 355/3 FU, 11, 14, 15, 355/30; 219/216, 388

[56] References Cited

U.S. PATENT DOCUMENTS

| | | | |
|---|---|---|---|
| 3,332,328 | 7/1967 | Roth | 355/3 R X |
| 3,655,280 | 4/1972 | Zoppoth | 355/3 FU |
| 3,914,046 | 10/1975 | Tanaka et al. | 355/3 DD |

*Primary Examiner*—R. L. Moses
*Attorney, Agent, or Firm*—Michael J. Striker

[57] ABSTRACT

A lamp of low ozone generation is used as the flash lamp, to minimize the amount of ozone reaching the machine exterior. A first cooling-air passage includes the space surrounding the flash lamp and its reflector and is provided downstream thereof with an activated-carbon filter, from which is discharged a quite hot first cooling-air stream of low volumetric flow rate. A second cooling-air stream emerging from the electronics compartment of the machine is much cooler and cleaner and of high volumetric flow rate. The first and second cooling-air streams are mixed together, to dilute and cool the first, prior to actual discharge to the machine exterior. The mixed air streams are discharged in downwards direction.

4 Claims, 1 Drawing Figure

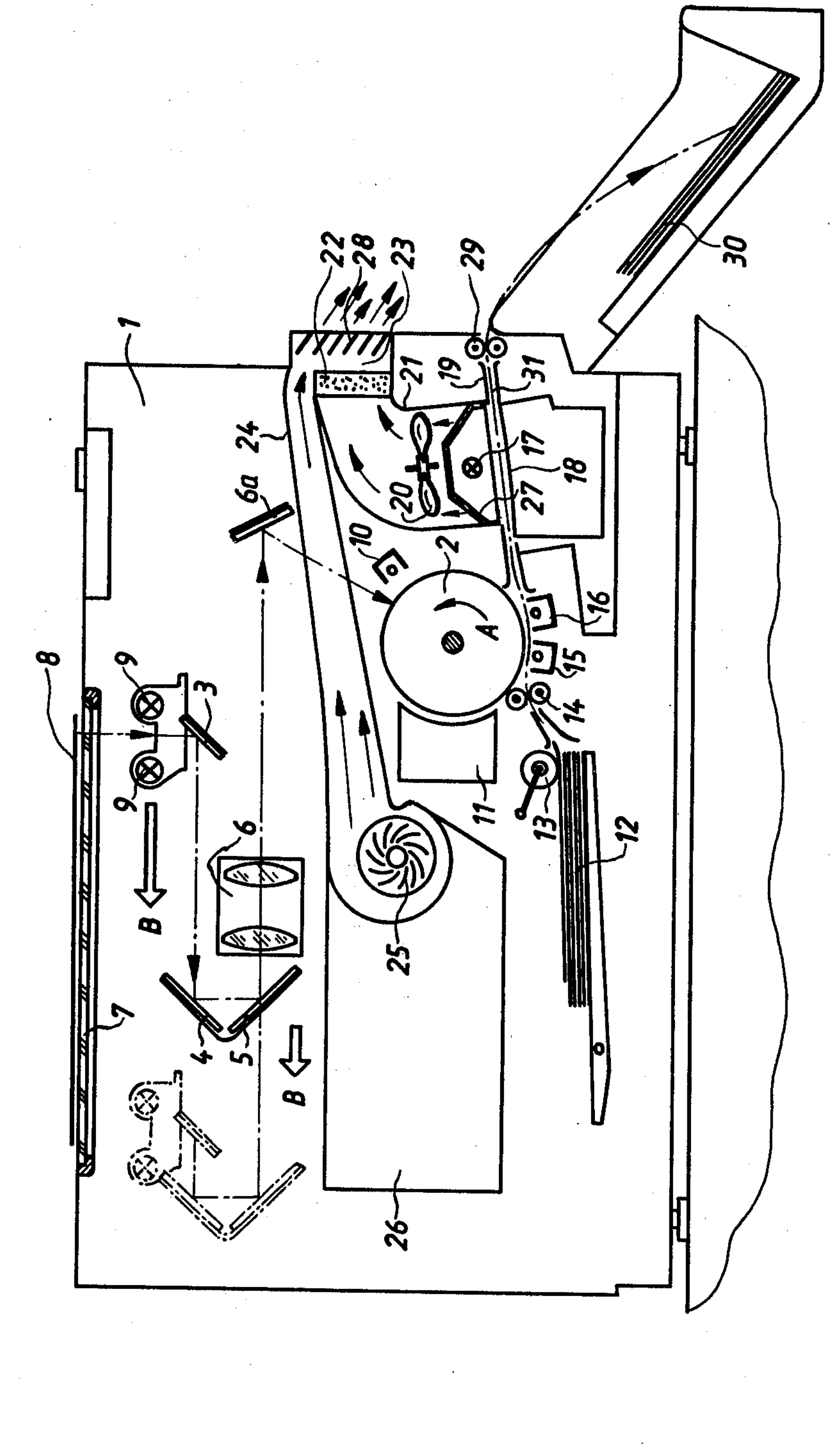
1
2
3
4
5
6
6a
7
8
9
9
10
11
12
13
14
15
16
17
18
19
20
21
22
23
24
25
26
27
28
29
30
31
A
B
B

ELECTROSTATIC COPYING MACHINE HAVING FLASH-DISCHARGE-LAMP FIXING UNIT

BACKGROUND OF THE INVENTION

The present invention relates to electrostatic copying machines of the type provided with flash-lamp fixing units. The flash lamp of the fixing unit emits a brief intense flash of radiant energy which raises the toner of the toner image on the copying medium to melting temperature and causes the toner image to be fused.

Copying machines of this type, provided with so-called flash-lamp fixing units, are disclosed for example in German allowed patent application No. 1,063,029, German published patent application No. 1,597,898 and German published patent application No. 1,908,827. It has been found that the performance of a flash fixing operation requires the use of high-energy flashes of radiation. As a result, when a flash operation is performed, a very sizable quantity of ozone may be generated in the air surrounding the flash lamp. Also, the intensity of the flash irradiation can result in partial decomposition of the relatively complex plastics of which the toner powder may be comprised into constituent components which, particularly if they vaporize, can be dangerous to inhale. If the number of flash operations performed per unit time are increased beyond a certain limit, the amount and concentration of environmentally undesirable and health-injurious ozone and toner vapors discharged to the exterior of the machine can become very serious.

SUMMARY OF THE INVENTION

It is a general object of the invention to be able to provide a copying machine of the type having a flash-lamp fixing unit which does not thusly threaten the environment and health, even if flash operations are performed at high frequency.

According to one concept of the invention, use is made of a flash lamp of low ozone generation. Furthermore, the space surrounding the reflector and flash lamp forms a cooling-air passage through which cooling-air is driven. In this passage, downstream of the flash lamp and reflector, there is provided a filter. Preferably, the flash lamp is an ultraviolet-filtered flash lamp, e.g., a flash lamp surrounded by a layer of UV-absorptive quartz, and the filter is an activated-carbon filter.

With this arrangement, the generation of ozone in the vicinity of the flash lamp is minimized, even if flashes of very high energy are being produced. Any toner vapors which are generated as a consequence of the intense irradiation of the toner image are removed from the stream of cooling air, prior to the discharge of the cooling air to the machine exterior.

According to a particularly advantageous concept of the invention, the flow of cooling air through the interior of the copying machine is divided into at least two parts, the first of which passes through the space surrounding the flash lamp and reflector, as just mentioned. The provision of an activated-carbon filter at the downstream end of the first cooling-air passage results in a cooling-air flow of low volumetric flow rate. In contrast, the volumetric flow rate of the second stream of cooling air is much higher. The two streams of cooling air, one of low the other of high volumetric flow rate, are continually mixed together, prior to their discharge to the machine exterior. Preferably, inclined discharge guide plates discharge the mixed cooling-air streams to the machine exterior with a slightly downwardly inclined direction. Advantageously, the second cooling-air stream passes through the interior of the electronics compartment of the copying machine.

With this expedient, the relatively hot and relatively low-volumetric-flow-rate stream of cooling air discharged from the outlet side of the filter is not discharged directly to the machine exterior. If this were done, then because of its high temperature and its low flow speed, it would, as soon as it left the discharge slots of the machine housing, rise up as a more or less cohesive cloud of gases and vapors, and could be easily inhaled by persons standing nearby. If that were the case, then even the presence of quite low residual amounts of pollutants could lead to irritation of the respiratory systems of such persons. Therefore, according to the inventive concept, this low-volumetric-flow-rate stream of hot cooling air, before being discharged to the machine exterior, is continually mixed into the high-volumetric-flow-rate stream of much cooler and cleaner air coming from, for example, the electronics compartment of the copying machine. As a result, the first air stream is very considerably diluted by the second air stream, prior to discharge.

It is furthermore contemplated that the thusly mixed cooling streams be discharged through a discharge grill comprised of downwardly inclined guide plates, so that the discharged air be discharged downwards, e.g., towards the floor where it cannot be directly inhaled. By the time such discharged cooling air rises to the level where it can be inhaled, it will be still further diluted by ambient air. When this is done, then even if quite considerable quantities of health-injurious gases or vapors are contained in the air discharged from the filter, the concentration of such pollutants in the air of the room containing the copying machine, particularly, at the level where such air can be inhaled, will be very low, and inhalable without the possibility of respiratory irritation.

The reflector housing surrounding the flash lamp is so designed that the radiation emitted by the lamp is distributed very uniformly upon that surface portion of the copying medium whose toner image is to be fixed. This expedient, too, contributes to the possibility of safely increasing the speed of the fixing operation. Due to the avoidance of loading spikes, as a consequence of the uniform irradiation implemented by such a reflector, the total amount of flash energy applied to the toner image to be fixed can be increased, without increasing any of the problems discussed above.

As flash lamp of low ozone generation preferably a gas discharge lamp, e.g., a Xenon lamp, is used which is surrounded by a filter absorbing all UV-light with a wave length smaller than 250 nm (nanometers).

BRIEF DESCRIPTION OF THE DRAWING

The single FIGURE is a half-schematic sectional view through an exemplary embodiment of the present invention.

DESCRIPTION OF THE PREFERRED EMBODIMENTS

Numeral 1 denotes the housing of an electrostatic copying machine. A copying drum 2 is mounted in the housing for rotation in the direction of arrow A. An optical system projects the image of an original 8 onto the photoconductive surface of the drum 2, during the course of a copying operation. The optical system includes a stationary objective 6 and a stationary deflecting mirror 6a, as well as a deflecting mirror 3 and light sources 9 which travel in the direction B, and a pair of deflector mirrors 4, 5 which likewise travel in direction B. The optical system per se is conventional and not described in detail here, except to note that during the course of a copying operation, the travelling units 3, 9, 9 and 4, 5 more leftward in the direction of arrow B, at different speeds, from the illustrated solid-line positions to the illustrated dash-dot-line positions, and then return to their solid-line positions for the copying of the next original 8. The original 8 to be copied rests on a transparent support plate 7.

A corona-discharge unit 10 is located at the periphery of copying drum 2, upstream of the location where exposure light is incident upon the drum. Corona-discharge unit 10 serves to uniformly charge up the surface of the copying drum, preliminary to its exposure to copying light. A developer unit 11 is located downstream of the exposure sector of drum 2, and serves to apply toner to and develop the latent electrostatic image on the surface of the drum. Located beneath developer unit 11 is a supply stack 12 of sheets of copying paper. A feeder 13 feeds these sheets one at a time into a pair of transport rollers 14. The transport rollers 14 transport the sheet of copying paper through the space between the drum 2 and a corona-discharge image-transfer unit 15. The latter transfers the toner image from the surface of the copying drum to the surface of the sheet of copying paper 31. Downstream of image-transfer unit 15, a corona-discharge take-off unit 16 cancels the electrostatic force of attraction between the drum surface and the sheet 31, which force develops during the image-transfer operation, so that the sheet can be removed from the copying drum and fed into a fixing unit.

The fixing unit includes a flash lamp 17. The flash lamp 17 fixes the toner image by producing a series of brief high-energy flashes. The toner, due to its relatively dark color, is preferentially or selectively heated by absorption of the infrared radiation contained within these flashes. The toner may comprise, for example, thermosplastic synthetic plastic and carbon black. The flash-type fixing operation brings the toner up to its melting temperature, so that it fuses upon the sheet of copying paper 31. In contrast, the white copying-paper stock reflects radiation and therefore is heated relatively little. The limited heating of the copying paper stock reduces the danger of scorching, and significantly enlarges the range of copying-paper types from which one may choose. In particular, it becomes possible to use copying stock of greatly varying heat capacity, mainly determined by the thickness and moisture content of the stock, because the success of the flash fixing operation does not require that the copying stock itself be brought up to any particular temperature. Likewise, the color of the copying stock no longer plays an important role, so long as its absorption spectrum does not approach that of the toner. Instead of being limited to smooth, white copying stock, use can be made, for example, of rough brown or gray paper, such as wrapping paper, or even transparent material. Furthermore, because of the low degree to which the copying stock itself becomes heated, the fixing operation cannot result in warping, curling or other mutilation such as could make the stock useless for furter processing, e.g., if the copying stock is in the form of perforated cards, or the like. Likewise, if the copying stock is provided on its back with a self-adhesive layer or with an impression-transfer layer, these layers will not be raised to temperatures at which they could soften.

The flash lamp 17 is surrounded from above by a reflector 27. Below the reflector 27, guide wires 18, 19, which do not absorb the emitted radiation, define the transport path for the copying sheet 31, as the latter travels through the fixing station. The reflector 27 itself forms part of a cooling-air channel 21 containing a fan 20. Fan 20 sucks in air from the exterior of the machine, draws the air through apertures in the reflector 27 and transmits this air to a filter 22 filled with active carbon. Downstream of the carbon filter 22, the air drawn through the flash-lamp compartment enters a mixing chamber 23, into which likewise opens a further cooling-air channel 24. The latter contains a fan 25 which draws air from the outside of the copying machine into and through a compartment 26. Compartment 26 is sealed off from the remainder of the interior of the copying machine and contains the control and safety circuitry of the machine. The cooling air drawn through electronics compartment 26 is heated by the electronic cirucuitry to a comparatively small extent, and does not pick up gases or vapors which are hazardous to health. This clean and only somewhat warmed cooling air can be discharged in unfiltered condition to the exterior of the copying machine. Thus, whereas the cooling air discharged from the flash-lamp compartment is slowed down in passing through carbon filter 20, that discharged from the electronics compartment 26 can be freely discharged at high speed through the discharge openings defined by inclined discharge guide plates 28. The guide plates 28 determine the direction in which the cooling air is discharged, and this direction is maintained even for a certain time after the cooling air has been discharged from the machine.

The high-volumetric-flow-rate air stream discharged from electronics compartment 26 is mixed, in mixing chamber 23, with the much hotter low-volumetric-flow-rate air stream discharged from the outlet face of carbon filter 20, before both air streams are discharged to the machine exterior. This prevents undiluted air from the carbon filter 20 from being directly discharged to the machine exterior in undiluted condition, where it could rise up into the nostrils of an operator standing nearby. With the illustrated expedient, an operator who works near the machine will not be irritated by any small residues of pollutants which may be present in the relatively hot air discharged from the carbon filter 20, first because this hot and possibly somewhat polluted air is mixed with a much greater quantity of relatively cool and clean air prior to discharge, and second because the high-volumetric-flow-rate discharge of the mixture causes the mixture to become quickly mixed with, and diluted by, the ambient air. This is particularly the case when as illustrated, guide plates 28 initially direct the discharged cooling air downward.

When the copying sheet 31 emerges from the fixing station, it is engaged by outfeed transport rollers 29 and is deposited into an outfeed bin 30.

It will be understood that each of the elements described above, or two or more together, may also find a useful application in other types of constructions differing from the types described above.

While the invention has been illustrated and described as embodied in a particular type of electrostatic copying machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An improved electrostatic copying machine of the type provided with a fixing station comprising a reflector and means including a flash lamp located within the reflector for fusing a toner image on a copying medium by applying thereto at least one brief high-energy flash of radiant energy to raise the temperature of the toner to its melting point, the improvement comprising means defining a cooling-air passage in the machine, the cooling-air passage including the space surrounding the reflector and flash lamp; and filter means provided in the cooling-air passage downstream of the reflector and flash lamp for removing from cooling air flowing through the cooling-air passage contaminants picked up in the vicinity of the reflector and flash lamp, said cooling-air passage being a first cooling-air passage, furthermore comprising means defining a second cooling-air passage extending through a different part of the interior of the copying machine, means establishing the flow of a first stream of cooling air through the first cooling-air passage and filter means and the flow of a second stream of cooling air through the second cooling-air passage of greater volumetric flow rate than the first stream of cooling air, and means at the downstream ends of the first and second cooling-air passages for effecting the discharge of cooling air from the cooling-air passage to the exterior of the copying machine and preliminary to such discharge the mixing together of the first and second streams of cooling air, to thereby dilute the first stream of cooling air by mixing the latter into the higher-volumetric-flow-rate second stream of cooling air prior to discharge.

2. The copying machine defined in claim 1, the means effecting the mixing and discharge of the first and second cooling-air streams including a discharge outlet and discharge guide elements at the discharge outlet for discharging the mixed cooling-air streams from the copying machine in a downwardly inclined direction.

3. The copying machine defined in claim 1, the interior of the machine including means defining an electronics compartment, the second cooling-air passage including the interior of the electronics compartment.

4. The copying machine defined in claim 1, the reflector housing being configured to distribute the radiation emitted from the flash lamp uniformly upon the entire surface area of that part of a copying paper carrying a toner image to be fixed.

* * * * *